United States Patent
Kim et al.

(10) Patent No.: US 11,610,536 B2
(45) Date of Patent: Mar. 21, 2023

(54) LED DRIVING DEVICE

(71) Applicant: LX Semicon Co., Ltd., Daejeon (KR)

(72) Inventors: Ji Hwan Kim, Daejeon (KR); Jang Su Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/503,031

(22) Filed: Oct. 15, 2021

(65) Prior Publication Data
US 2022/0130326 A1 Apr. 28, 2022

(30) Foreign Application Priority Data
Oct. 23, 2020 (KR) .......................... 10-2020-0138076

(51) Int. Cl.
G09G 3/32 (2016.01)
(52) U.S. Cl.
CPC ......... *G09G 3/32* (2013.01); *G09G 2320/064* (2013.01)
(58) Field of Classification Search
CPC .......................... G09G 3/32; G09G 2320/064
See application file for complete search history.

(56) References Cited

U.S. PATENT DOCUMENTS

| | | | |
|---|---|---|---|
| 8,569,965 B2 | 10/2013 | Uchimoto et al. | |
| 9,390,647 B2 | 7/2016 | Li et al. | |
| 9,955,542 B2 | 4/2018 | Li et al. | |
| 2003/0052904 A1* | 3/2003 | Gu | G09G 3/3216 345/691 |
| 2009/0122003 A1* | 5/2009 | Chen | H05B 45/18 315/307 |
| 2009/0141049 A1* | 6/2009 | Ha | G09G 3/3406 345/690 |
| 2012/0146531 A1 | 6/2012 | Uchimoto et al. | |
| 2014/0139139 A1* | 5/2014 | Li | G09G 3/32 315/297 |

FOREIGN PATENT DOCUMENTS

| | | | |
|---|---|---|---|
| JP | WO 2016/157494 A1 | 9/2017 | |
| KR | 10-1883001 B1 | 7/2018 | |
| KR | 10-2175899 B1 | 11/2020 | |

* cited by examiner

*Primary Examiner* — Stephen G Sherman
(74) *Attorney, Agent, or Firm* — Rothwell, Figg, Ernst & Manbeck, P.C.

(57) ABSTRACT

An embodiment relates to an LED driving technique. The embodiment provides a technique of measuring a forward voltage reaching time of a currently driven LED by comparing a forward voltage sensed in a previous scan line and an LED voltage sensed in a current scan line, and compensating an ON period of a pulse width modulation (PWM) signal by the measured forward voltage reaching time.

15 Claims, 10 Drawing Sheets

LED DRIVING DEVICE

CROSS REFERENCE TO RELATED APPLICATION

This application claims priority from Korean Patent Application No. 10-2020-0138076, filed on Oct. 23, 2020, which is hereby incorporated by reference for all purposes as if fully set forth herein.

BACKGROUND

1. Technical Field

Various embodiments generally relate to an LED driving technique.

2. Related Art

With the development of informatization, various display devices capable of visualizing information are being developed. A liquid crystal display (LCD), an organic light emitting diode (OLED) display device and a plasma display panel (PDP) display device are representative examples of display devices which have been developed so far or are being developed. These display devices are being developed to appropriately display high-resolution images.

However, the above-described display devices have advantages in terms of high resolution, but have disadvantages in that it is difficult to fabricate the display devices in large sizes. For example, since large OLED display devices developed so far have sizes of 80 inches (about 2 m) and 100 inches (about 2.5 m), they are not suitable for fabricating a large display device with a width of more than 10 m.

As a method for solving such a problem in terms of large size, interest in a light emitting diode (LED) display device has been increasing recently. In an LED display device technique, as modularized LED pixels are disposed by a required number, one large panel may be configured. Otherwise, in an LED display device technique, as unit panels each of which is configured by a plurality of LED pixels are disposed by a required number, one large panel structure may be formed. As such, in the LED display device techniques, by disposing LED pixels by increasing the number thereof as many as required, a large display device may be easily realized.

The LED display device is advantageous in terms of not only large size but also various panel sizes. In the LED display device techniques, it is possible to variously adjust horizontal and vertical sizes according to appropriate disposition of LED pixels.

Meanwhile, the LED display device supplies driving current to an LED during an ON period of a PWM (pulse width modulation) signal. The ON period of the PWM signal is determined depending on a gray scale value of the LED. However, the LED does not emit light as soon as the driving current is supplied, and normal light emission is implemented only when a voltage across the LED reaches a forward voltage. Therefore, when the driving current is supplied during the ON period of the PWM signal, the actual brightness of the LED does not reach the gray scale value.

SUMMARY

Under such a background, in one aspect, various embodiments are directed to providing a technique for more accurately controlling an ON period of a PWM signal so that the brightness of an LED can match a gray scale value. In another aspect, various embodiments are directed to providing a technique for compensating a PWM signal for a forward voltage reaching time of an LED so that no loss in a gray scale value is caused. In still another aspect, various embodiments are directed to providing a technique for simply measuring a forward voltage reaching time of an LED without using a separate sequence. In yet another aspect, various embodiments are directed to providing a technique for accurately measuring a forward voltage reaching time of an LED, regardless of a change in characteristics of a panel, by continuously updating a forward voltage of the LED. In still yet another aspect, various embodiments are directed to providing a technique for compensating a PWM signal using a simple circuit.

In one aspect, an embodiment may provide an LED driving device including: a driving current source configured to supply driving current to a driving line to which a plurality of LEDs are connected; a driving control circuit configured to control a supply time of the driving current to the driving line according to a PWM (pulse width modulation) signal; a measurement circuit configured to sense a one-side voltage of the LED, and output a comparison voltage corresponding to a forward voltage of the LED and the one-side voltage; and a PWM compensating circuit configured to, during a scan time for the LED, change a state of a first element during a time in which the one-side voltage reaches the comparison voltage, and compensate for the PWM signal depending on a time during which a state of a second element is changed to correspond to that of the first element.

The PWM compensating circuit may reset the first element and the second element to the same state before the scan time for the LED.

The first element and the second element may have substantially the same impedance.

The driving control circuit may control the driving current to be supplied to the driving line during an ON period of the PWM signal, and the PWM compensating circuit may change the state of the second element from an ending time point of the ON period of the PWM signal before compensation.

The comparison voltage may be a forward voltage of another LED which is driven during a previous scan time.

The measurement circuit may measure and store a forward voltage of each LED, and may generate the comparison voltage according to a stored value.

The measurement circuit may measure a forward voltage of each LED using a counter, and may store an output value of the counter in a memory.

In another aspect, an embodiment may provide an LED driving device including: a driving current source configured to supply driving current to a driving line to which a plurality of LEDs are connected; a driving control circuit configured to control a supply time of the driving current to the driving line according to a PWM (pulse width modulation) signal; a measurement circuit configured to sense a one-side voltage of the LED, and output a comparison voltage, corresponding to a forward voltage of the LED, and the one-side voltage; and a PWM compensating circuit configured to, during a scan time for the LED, change a voltage of a first capacitor during a time in which the one-side voltage reaches the comparison voltage, and extend an ON period of the PWM signal during a time in which a voltage of a second capacitor is changed to correspond to a changed voltage of the first capacitor.

The PWM compensating circuit may reset the first capacitor and the second capacitor to the same state before the scan time for the LED.

The PWM compensating circuit may change a voltage while charging or discharging the first capacitor and the second capacitor using constant current.

Capacities of the first capacitor and the second capacitor may be substantially the same, and a magnitude of current which charges or discharges the first capacitor may be substantially the same as a magnitude of current which charges or discharges the second capacitor.

The PWM compensating circuit may include: a comparator configured to output a comparison value of the one-side voltage and the comparison voltage during a period in which a voltage of the first capacitor is changed, and output a comparison value of a voltage of the first capacitor and a voltage of the second capacitor during a period in which a voltage of the second capacitor is changed.

The comparator may receive, as inputs, the one-side voltage, the comparison voltage, a voltage of the first capacitor and a voltage of the second capacitor, and may output a comparison value of the one-side voltage and the comparison voltage or a comparison value of a voltage of the first capacitor and a voltage of the second capacitor.

The measurement circuit may hold the one-side voltage measured at a time point when an ON period of the PWM signal during a K (K is a natural number)-th scan time ends, and may output the held voltage as the comparison voltage during a (K+1)-th scan time.

The measurement circuit may measure and store a forward voltage of each LED, and may generate the comparison voltage according to a stored value.

As is apparent from the above description, according to the embodiments, it is possible to more accurately control an ON period of a PWM signal so that the brightness of an LED can match a gray scale value. Also, according to the embodiments, it is possible to compensate for a PWM signal for a forward voltage reaching time of an LED so that no loss in a gray scale value is caused. Further, according to the embodiments, it is possible to simply measure a forward voltage reaching time of an LED without using a separate sequence. Moreover, according to the embodiments, it is possible to accurately measure a forward voltage reaching time of an LED, regardless of a change in characteristics of a panel, by continuously updating a forward voltage of the LED. In addition, according to the embodiments, it is possible to compensate for a PWM signal using a simple circuit.

DETAILED DESCRIPTION

Figure 1:
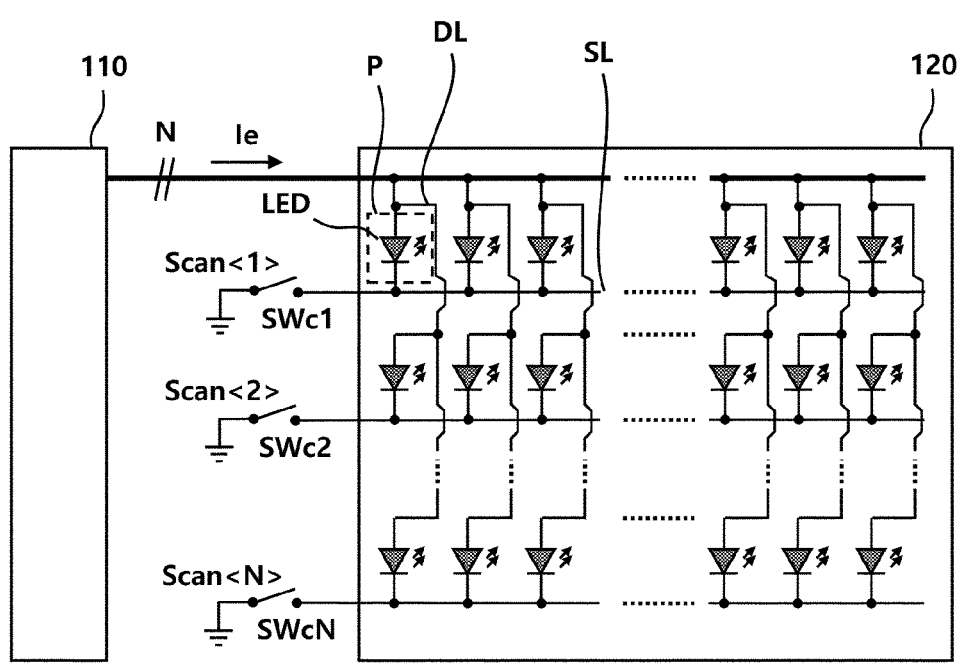
FIG. 1 is a configuration diagram of a display device in accordance with an embodiment.

FIG. 1 is a configuration diagram of a display device in accordance with an embodiment.

Referring to FIG. 1, a display device 100 may include a driving device 110 and a panel 120.

In the panel 120, a plurality of pixels P may be disposed while forming a matrix in a first direction (for example, a horizontal direction in FIG. 1) and a second direction (for example, a vertical direction in FIG. 1).

At least one LED (light emitting diode) may be disposed in each pixel P, and the brightness of the pixel P may be determined depending on the brightness of the LED.

Driving lines DL and scan lines SL may be disposed in the panel 120. Each driving line DL may connect one sides of pixels P in the second direction, and each scan line SL may connect the other sides of pixels P in the first direction. For example, an anode side of the LED disposed in the pixel P may be electrically connected to the driving line DL, and a cathode side of the LED may be electrically connected to the scan line SL. In the aspect that cathode sides of LEDs are connected in common, the structure illustrated in FIG. 1 is referred to as a common cathode structure, but it is to be noted that the present embodiment is not limited to such a structure.

Scan switches SWc1, SWc2, . . . and SWcN may be disposed in the scan lines SL, respectively, and a scan line SL to which driving current Ie is to be supplied may be determined depending on the opening and closing of the scan switches SWc1, SWc2, . . . and SWcN.

Figure 2:
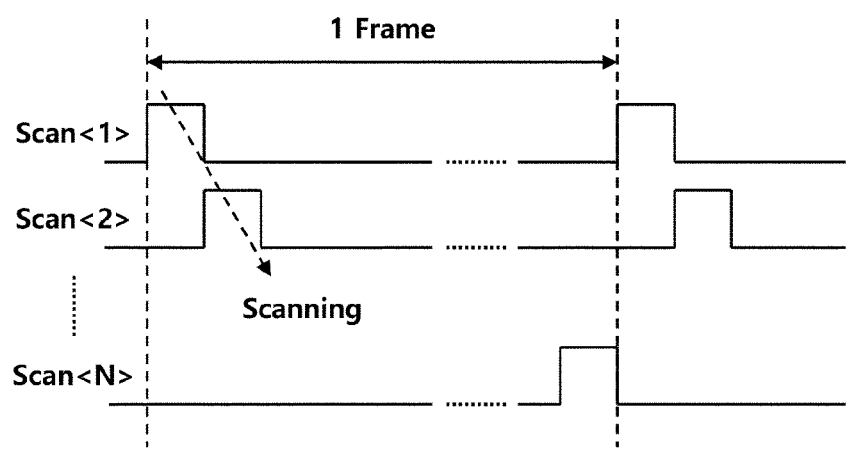
FIG. 2 is a diagram showing waveforms of scan signals in the display device in accordance with the embodiment.

FIG. 2 is a diagram showing waveforms of scan signals in the display device in accordance with the embodiment.

Referring to FIGS. 1 and 2 together, scan signals Scan<1>, Scan<2>, . . . and Scan<N> may be sequentially supplied to the scan switches SWc1, SWc2, . . . and SWcN, respectively, in each frame. The driving current Ie may be sequentially supplied to a first scan line SL, a second scan line SL, . . . and an N-th scan line SL depending on the scan signals Scan<1>, Scan<2>, . . . and Scan<N>.

The scan line SL may be connected to a low voltage part, such as the ground, in the display device 100. The scan switches SWc1, SWc2, . . . and SWcN may be formed in the panel 120 or a separate substrate. According to an embodiment, the scan switches SWc1, SWc2, . . . and SWcN may be formed in the driving device 110.

The scan signals Scan<1>, Scan<2>, . . . and Scan<N> may be supplied by the driving device 110 or may be supplied by a separate control device.

The brightness of the LED disposed in each pixel P may be determined depending on an amount of driving power supplied within a predetermined time. The LED may be PWM (pulse width modulation)-driven, and the brightness of the LED may be determined depending on a rate of a turn-on time within a PWM control time. When the LED is turned on by the driving current Ie, a forward voltage may be formed in the LED. An amount of driving power supplied to the LED may be obtained by accumulating the product of the forward voltage and the driving current Ie for the turn-on time within the PWM control time, and the brightness of the LED may be determined depending on the amount of driving power. Assuming that the forward voltage of the LED and a magnitude of the driving current Ie are fixed variables, the amount of driving power may be regarded as having a value that is proportional to the turn-on time within the PWM control time. According to this principle, the driving device 110 may control the brightness of the LED and the brightness of the pixel P by controlling the turn-on time within the PWM control time.

The driving device 110 may include a plurality of channels N which are connected to driving lines DL, and may supply the driving current Ie to each pixel P in each channel.

Meanwhile, an LED display device supplies driving current to an LED during an ON period of a PWM (pulse width modulation) signal. The ON period of the PWM signal is determined depending on a gray scale value of the LED. However, the LED does not emit light as soon as the driving current is supplied, and normal light emission is implemented only when a voltage across the LED reaches a forward voltage. Therefore, when the driving current is supplied during the ON period of the PWM signal, the actual brightness of the LED does not reach the gray scale value.

In order to solve such a problem, an embodiment provides a technique for compensating a PWM signal for a forward voltage reaching time of an LED so that the brightness of the LED can match a gray scale value.

Figure 3:
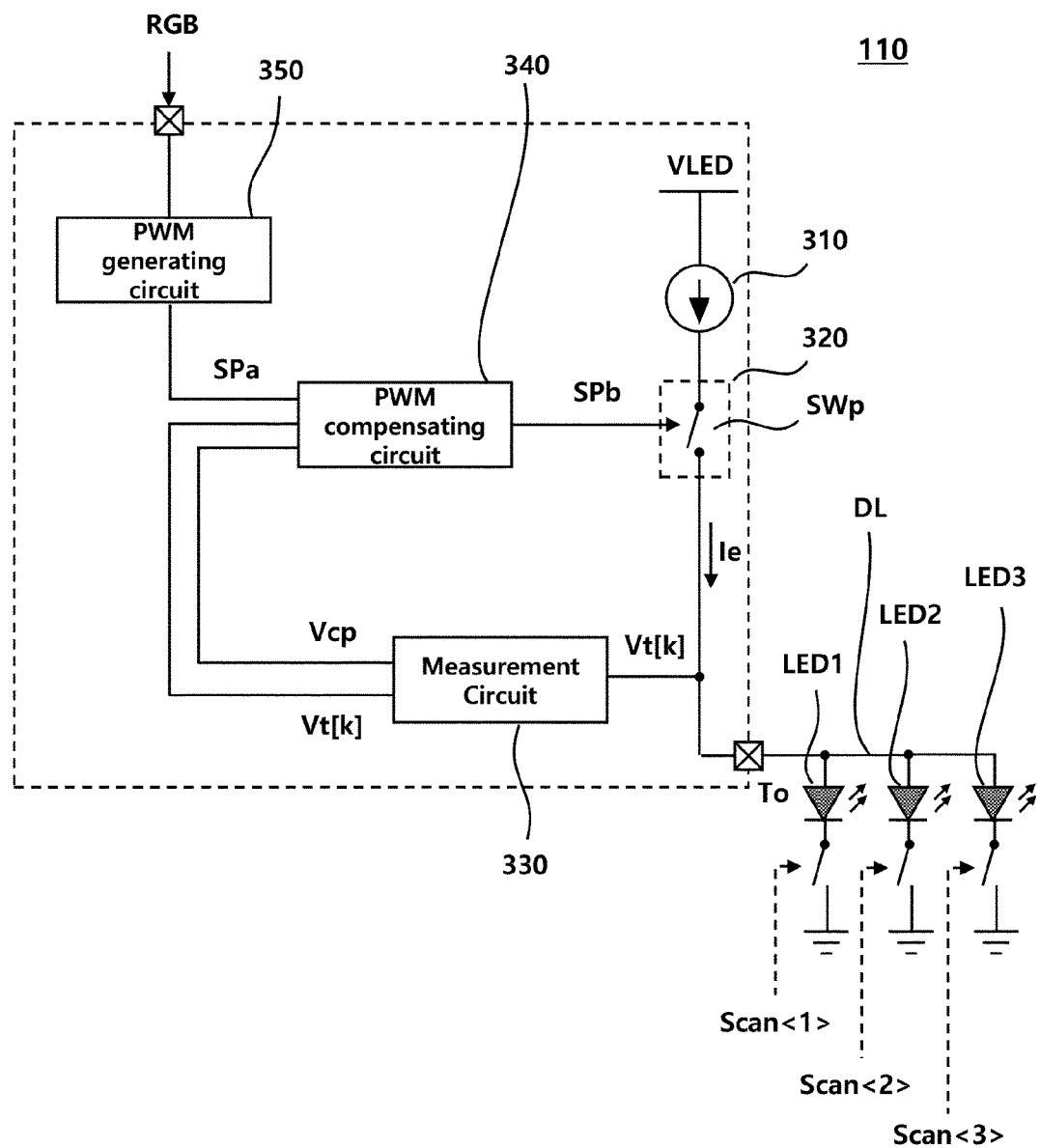
FIG. 3 is a configuration diagram of an LED driving device in accordance with an embodiment.

FIG. 3 is a configuration diagram of an LED driving device in accordance with an embodiment.

Referring to FIG. 3, the LED driving device 110 (hereinafter, referred to as a driving device) may include a driving current source 310, a driving control circuit 320, a measurement circuit 330, a PWM compensating circuit 340 and a PWM generating circuit 350.

The driving current source 310 may supply the driving current Ie to the driving line DL to which a plurality of LEDs LED1 to LED3 are connected. The driving current Ie may be supplied to one LED which is connected to the driving line DL among the plurality of LEDs LED1 to LED3.

One LED to which the driving current Ie is to be supplied may be determined by scan signals Scan<1> to Scan<3>. For example, when a first scan signal Scan<1> is supplied, a first LED LED1 may be connected to the driving line DL and the driving current Ie may be supplied to the first LED LED1, and when a second scan signal Scan<2> is supplied, a second LED LED2 may be connected to the driving line DL and the driving current Ie may be supplied to the second LED LED2.

A time during which each of the scan signals Scan<1> to Scan<3> is supplied may be referred to as a scan time. For example, the driving current Ie may be supplied to the first LED LED1 during a first scan time in which the first scan signal Scan<1> is supplied, and may be supplied to the second LED LED2 during a second scan time in which the second scan signal Scan<2> is supplied.

The driving control circuit 320 may control a supply time of the driving current Ie to the driving line DL. As an example, the driving control circuit 320 may control the connection between the driving current source 310 and the driving line DL. When the driving control circuit 320 connects the driving current source 310 and the driving line DL, the driving current Ie generated by the driving current source 310 may be supplied to the driving line DL, and when the driving control circuit 320 disconnects the driving current source 310 and the driving line DL, the supply of the driving current Ie to the driving line DL may be stopped.

The driving control circuit 320 may include a switch circuit SWp which controls the connection between the driving current source 310 and the driving line DL. The switch circuit SWp may connect or disconnect the driving current source 310 and the driving line DL depending on a PWM (pulse width modulation) signal. The PWM signal may have an ON period and an OFF period. In general, in the PWM signal, a period in which a voltage has a high level may be the ON period, and a period in which a voltage has a low level may be the OFF period. The switch circuit SWp may connect the driving current source 310 to the driving line DL during the ON period of the PWM signal, and may disconnect the driving current source 310 and the driving line DL during the OFF period of the PWM signal.

The measurement circuit 330 may sense a one-side voltage of the LEDs LED1 to LED3. One sides of the LEDs LED1 to LED3 may be connected to the driving line DL, and the measurement circuit 330 may sense the one-side voltage of the LEDs LED1 to LED3 through the driving line DL. One terminal To of the LED driving device 110 may be connected to the driving line DL, and the measurement circuit 330 may sense a voltage formed at the one terminal To. In the following description, a voltage Vt formed at the one terminal To is referred to as a terminal voltage. The terminal voltage Vt may correspond to a voltage of the driving line DL, and may correspond to the one-side voltage of the LEDs LED1 to LED3. The driving current Ie may be supplied to the driving line DL through the one terminal To.

The measurement circuit 330 may sense the one-side voltage of the LEDs LED1 to LED3, and may measure a comparison voltage Vcp corresponding to a forward voltage of the LEDs LED1 to LED3. The measurement circuit 330 may output the one-side voltage of the LEDs LED1 to LED3 and the comparison voltage Vcp.

As a first example of outputting the comparison voltage Vcp, the measurement circuit 330 may measure the forward voltage of the LEDs LED1 to LED3 at a specific time point and store the measured forward voltage in a memory, and may output the comparison voltage Vcp by reading, from the memory, the forward voltage for each of the LEDs LED1 to LED3 according to a driving sequence.

According to the first example, the measurement circuit 330 may measure a voltage corresponding to a forward voltage as the one-side voltage of the LEDs LED1 to LED3 sensed at a specific time point (for example, a time point within a predetermined time after the LED driving device 110 starts to operate), and may store the measured voltage in the memory. The forward voltage may mean a voltage difference between both ends (an anode and a cathode) of each of the LEDs LED1 to LED3 when each of the LEDs LED1 to LED3 is normally conductive. The LED driving device 110 may determine that, when a voltage across each of the LEDs LED1 to LED3 reaches the forward voltage, each of the LEDs LED1 to LED3 normally emits light. In the case where the one-side voltage of each of the LEDs LED1 to LED3 sensed by the measurement circuit 330 is a voltage which is formed at the anode of each of the LEDs LED1 to LED3 and the cathode of each of the LEDs LED1 to LED3 is connected to a base voltage (for example, the ground), the one-side voltage of each of the LEDs LED1 to LED3 may be the same as the voltage across each of the LEDs LED1 to LED3.

The measurement circuit 330 may measure a voltage at a time point when it is determined that the one-side voltage of the LEDs LED1 to LED3 has reached a forward voltage, and may store a measured value in the memory. For example, when a predetermined time has elapsed after the driving current Ie is supplied to the LEDs LED1 to LED3, it may be determined that the LEDs LED1 to LED3 normally emit light. At this time point, the measurement circuit 330 may measure the one-side voltage of the LEDs LED1 to LED3 as the forward voltage, and may store a measured value in the memory.

The measurement circuit 330 may measure forward voltages of all the LEDs LED1 to LED3 during a specific time period (for example, a period within a predetermined time after the LED driving device 110 starts to operate), and may store measured values in the memory. During a scan time of each of the LEDs LED1 to LED3, the measurement circuit 330 may convert a measured value of a forward voltage, stored in the memory, into the comparison voltage Vcp and output the converted comparison voltage Vcp.

The measurement circuit 330 may measure the forward voltage of each of the LEDs LED1 to LED3 by using a counter, and may store an output value of the counter in the memory.

As a second example of outputting the comparison voltage Vcp, the measurement circuit 330 may hold a forward voltage of another LED during a previous scan time, and may output the held forward voltage of another LED as the comparison voltage Vcp during a current scan time.

According to the second example, the measurement circuit 330 may hold a voltage, corresponding to a forward voltage, among sensed voltages. The forward voltage may mean a voltage difference between both ends (an anode and a cathode) of each of the LEDs LED1 to LED3 when each of the LEDs LED1 to LED3 is normally conductive. The LED driving device 110 may determine that, when a voltage across each of the LEDs LED1 to LED3 reaches the forward voltage, each of the LEDs LED1 to LED3 normally emits light. In the case where the one-side voltage of each of the LEDs LED1 to LED3 sensed by the measurement circuit 330 is a voltage which is formed at the anode of each of the LEDs LED1 to LED3 and the cathode of each of the LEDs LED1 to LED3 is connected to a base voltage (for example, the ground), the one-side voltage of each of the LEDs LED1 to LED3 may be the same as the voltage across each of the LEDs LED1 to LED3.

The measurement circuit 330 may hold a voltage at a time point when it is determined that the one-side voltage of the LEDs LED1 to LED3 has reached a forward voltage. For example, when a predetermined time has elapsed after the driving current Ie is supplied to the LEDs LED1 to LED3, it may be determined that the LEDs LED1 to LED3 normally emit light. At this time point, the measurement circuit 330 may sample and hold the one-side voltage of the LEDs LED1 to LED3 as the forward voltage.

As an example, at a time point when the supply of the driving current Ie to the LEDs LED1 to LED3 is ended, the measurement circuit 330 may sample and hold the one-side voltage of the LEDs LED1 to LED3, and thereby, may sample and hold the forward voltage of the LEDs LED1 to LED3. The driving current Ie may be supplied to the LEDs LED1 to LED3 during the ON period of the PWM signal, and the measurement circuit 330 may sample and hold the forward voltage of the LEDs LED1 to LED3 at or near a falling edge of the PWM signal.

The measurement circuit 330 may measure a forward voltage reaching time by sensing the terminal voltage Vt (a voltage corresponding to the one-side voltage of the LEDs LED1 to LED3) during an early period of driving the LEDs LED1 to LED3, and may hold the forward voltage by sensing the terminal voltage Vt during a late period of driving the LEDs LED1 to LED3.

When the ON period of the PWM signal starts (for example, a rising edge of the PWM signal is checked), the measurement circuit 330 may sense the terminal voltage Vt and compare the terminal voltage Vt with a previously stored (previously held) forward voltage. The measurement circuit 330 may store a time for the terminal voltage Vt to reach the forward voltage. When such a time is referred to as the forward voltage reaching time, the LED driving device 110 may compensate for a supply time of the driving current Ie by using the forward voltage reaching time.

At a time point when the ON period of the PWM signal ends (for example, a time point when a falling edge of the PWM signal is checked), the measurement circuit 330 may sense the terminal voltage Vt, and may store (hold) the terminal voltage Vt as the forward voltage. The held voltage may be used in driving a next scan line.

For the sake of convenience in explanation, hereinafter, a terminal voltage which is sensed during a K-th (K is a natural number of 2 or greater) scan time for driving a K-th scan line is symbolized as Vt[k].

The measurement circuit 330 may sense a terminal voltage Vt[k−1] according to the PWM signal during a (K−1)-th scan time, and may hold a voltage corresponding to a forward voltage. The held voltage may be symbolized as Vf[k−1]. A voltage to be held may be updated every scan time. The measurement circuit 330 may sense the terminal voltage Vt[k] according to the PWM signal during the K-th scan time, and may update a voltage corresponding to a forward voltage. The measurement circuit 330 may include a hold element (for example, a capacitor), and may hold and update a forward voltage in the hold element.

The measurement circuit 330 may sense the terminal voltage Vt[k] according to the PWM signal during the K-th scan time. The measurement circuit 330 may transfer the terminal voltage Vt[k] sensed during the K-th scan time and the voltage Vf[k−1], held during the (K−1)-th scan time, as the comparison voltage Vcp to the PWM compensating circuit 340.

The PWM compensating circuit 340 may measure a forward voltage reaching time of an LED driven among the LEDs LED1 to LED3, and may increase a supply time of the driving current Ie by the forward voltage reaching time.

During a time period (a scan time) in which one LED is connected to the driving line DL, the PWM compensating circuit 340 may measure a time for a one-side voltage of the one LED to reach the comparison voltage Vcp, as the forward voltage reaching time.

The PWM compensating circuit 340 may store the forward voltage reaching time in one element (for example, a capacitor), and may compensate for the PWM signal so that the ON period of the PWM signal is increased. The forward voltage reaching time may have little or no contribution to the luminance of the LEDs LED1 to LED3. Thus, the PWM compensating circuit 340 may increase a driving time of the LEDs LED1 to LED3 by increasing the ON period of the PWM signal by the forward voltage reaching time.

The PWM compensating circuit 340 may generate a secondary PWM signal SPb by compensating a primary PWM signal SPa transferred from the PWM generating circuit 350, and may transfer the secondary PWM signal SPb to the driving control circuit 320.

The PWM generating circuit 350 may generate the primary PWM signal SPa depending on a gray scale value included in image data. The image data may be received from an external device (for example, a host device, a timing controller, or the like), and a gray scale value indicating a luminance that each LED needs to display may be included in the image data. The PWM generating circuit 350 may generate the primary PWM signal SPa in conformity with the gray scale value. The PWM compensating circuit 340 may generate the secondary PWM signal SPb by compensating the primary PWM signal SPa.

Figure 4:
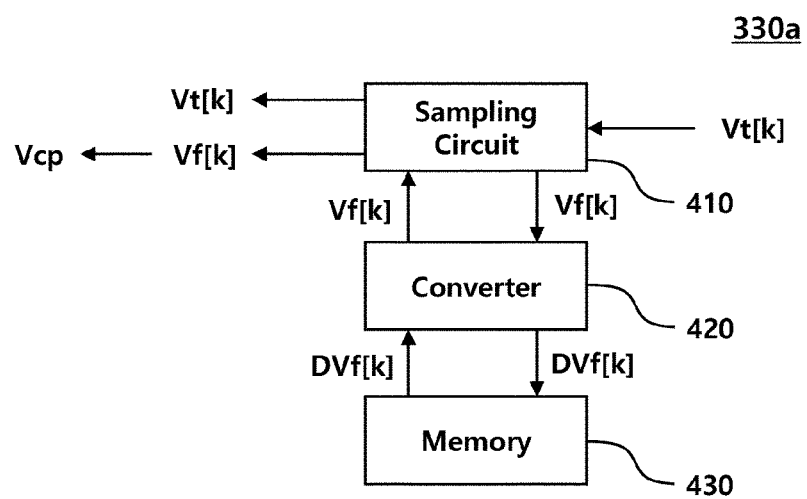
FIG. 4 is a configuration diagram of a measurement circuit according to a first example.
Figure 5:
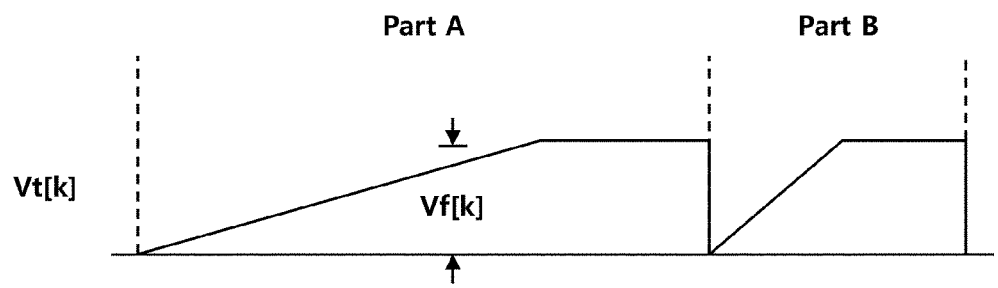
FIG. 5 is a waveform diagram of a terminal voltage according to the first example.

FIG. 4 is a configuration diagram of a measurement circuit according to a first example, and FIG. 5 is a waveform diagram of a terminal voltage according to the first example.

Referring to FIG. 4, a measurement circuit 330a may include a sampling circuit 410, a converter 420 and a memory 430.

The sampling circuit 410 may sense a terminal voltage Vt[k]. The sampling circuit 410 may output the terminal voltage Vt[k] as a one-side voltage of an LED.

The sampling circuit 410 may transfer a voltage Vf[k], corresponding to a forward voltage among terminal voltages Vt[k], to the converter 420. The converter 420 may convert the voltage Vf[k] corresponding to the forward voltage into digital data DVf[k] and store the digital data DVf[k] in the memory 430. The converter 420 may convert the voltage Vf[k] corresponding to the forward voltage into the digital data DVf[k] using a counter or the like.

Referring to FIG. 5, the measurement circuit 330a may time-divisionally perform the measurement of the forward voltage of the LED and the driving of the LED.

The measurement circuit 330a may measure the forward voltage Vf[k] of the LED during a first period Part A. The LED driving device 110 may drive the LED during a second period Part B. During the first period Part A, the measurement circuit 330a may convert the voltage Vf[k], corresponding to the forward voltage among the terminal voltages Vt[k], into the digital data DVf[k] and store the digital data DVf[k] in the memory 430. During the second period Part B, the measurement circuit 330a may convert the forward voltage, stored in the memory 430, into the comparison voltage Vcp. The LED driving device 110 may drive the LED using the comparison voltage Vcp.

During a scan time of each LED corresponding to the second period Part B, the converter 420 may read the digital data DVf[k] from the memory 430 and generate the forward voltage Vf[k] of each LED, and the sampling circuit 410 may output the forward voltage Vf[k] of each LED as the comparison voltage Vcp.

Figure 6:
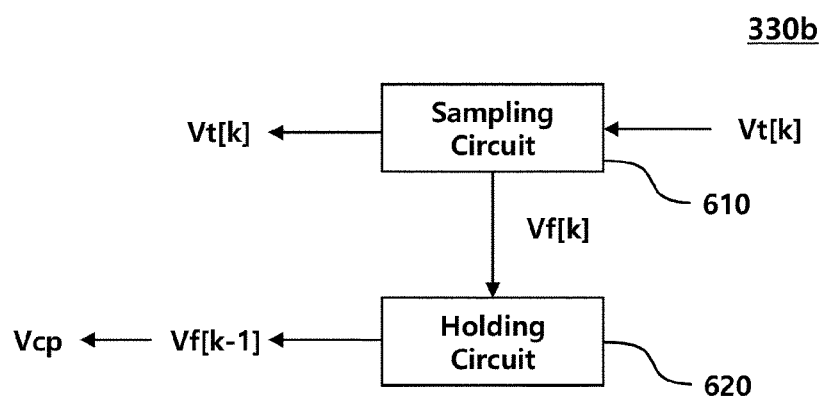
FIG. 6 is a configuration diagram of a measurement circuit according to a second example.
Figure 7:
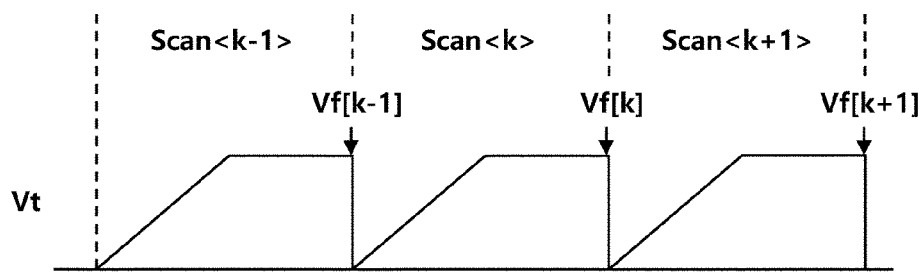
FIG. 7 is a waveform diagram of a terminal voltage according to the second example.

FIG. 6 is a configuration diagram of a measurement circuit according to a second example, and FIG. 7 is a waveform diagram of a terminal voltage according to the second example.

Referring to FIG. 6, a measurement circuit 330b may include a sampling circuit 610 and a holding circuit 620.

The sampling circuit 610 may sense a terminal voltage Vt[k], and may output the terminal voltage Vt[k] as a one-side voltage of an LED.

The sampling circuit 610 may transfer a voltage Vf[k], corresponding to a forward voltage among terminal voltages Vt[k], to the holding circuit 620.

The holding circuit 620 may hold the voltage Vf[k], corresponding to the forward voltage, using a capacitor or the like.

The holding circuit 620 may output a voltage Vf[k−1], corresponding to a forward voltage, held during a previous scan time, as the comparison voltage Vcp, and may update a holding voltage with the voltage Vf[k], corresponding to the forward voltage, received during a current scan time.

Referring to FIG. 7, the measurement circuit 330b may measure a forward voltage during each scan time of driving an LED.

The measurement circuit 330b may sense a terminal voltage Vt[k−1] during a (K−1)-th scan time Scan<k−1>, and may hold a voltage Vf[k−1] corresponding to a forward voltage. The measurement circuit 330b may sense a terminal voltage Vt[k] during a K-th scan time Scan<k>, and may update a voltage Vf[k] corresponding to a forward voltage. The measurement circuit 330b may include a hold element (for example, a capacitor), and may hold and update a forward voltage in the hold element.

The measurement circuit 330b may sense the terminal voltage Vt[k] during the K-th scan time. The measurement circuit 330b may transfer the terminal voltage Vt[k], sensed during the K-th scan time, to the PWM compensating circuit 340, and may transfer the voltage Vf[k−1], held during the (K−1)-th scan time, as the comparison voltage Vcp to the PWM compensating circuit 340.

The same process may be repeated during a (K+1)-th scan time Scan<k+1>.

Figure 8:
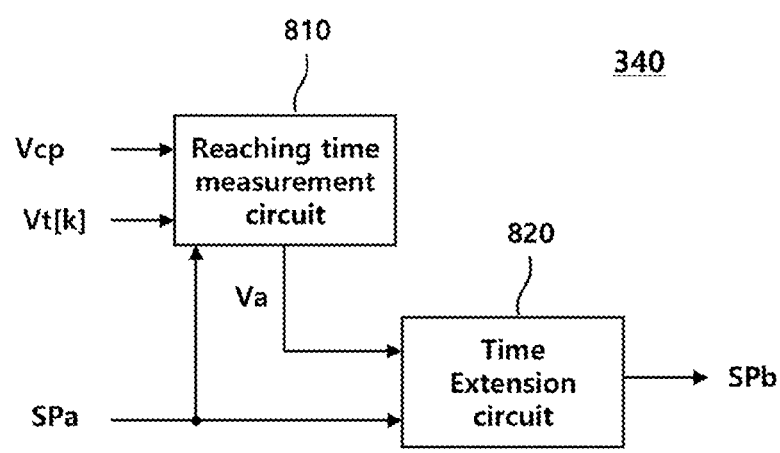
FIG. 8 is a configuration diagram of a PWM compensating circuit in accordance with an embodiment.

FIG. 8 is a configuration diagram of a PWM compensating circuit in accordance with an embodiment.

Referring to FIG. 8, the PWM compensating circuit 340 may include a reaching time measurement circuit 810 and a time extension circuit 820.

The reaching time measurement circuit 810 may receive the comparison voltage Vcp and the terminal voltage Vt[k], and may measure a time for the terminal voltage Vt[k], sensed during a current scan time, to reach the comparison voltage Vcp, while comparing the two voltages using a comparator.

For example, the reaching time measurement circuit 810 may receive a forward voltage held during another scan time (for example, the forward voltage Vt[k−1] held during the (K−1)-th scan time) and a terminal voltage sensed during the current scan time (for example, the terminal voltage Vt[k] sensed during the K-th scan time). The reaching time measurement circuit 810 may measure a time for the terminal voltage, sensed during the current scan time, to reach the forward voltage held during another scan time, while comparing the two voltages using the comparator. A starting time point of measurement may be a time point corresponding to a rising edge of the primary PWM signal SPa, and an ending time point of the measurement may be a time point when an output of the comparator is inverted.

The forward voltage reaching time may be stored as a voltage value Va. An example of the voltage value Va will be described later with reference to FIGS. 9 to 11.

The time extension circuit 820 may receive the voltage value Va corresponding to the forward voltage reaching time and the primary PWM signal SPa, and may generate the secondary PWM signal SPb by increasing the ON period of the primary PWM signal SPa depending on the forward voltage reaching time.

The PWM compensating circuit 340 may compensate for a PWM signal using a simple circuit which does not use a memory or a counter.

For example, during a scan time for an LED, the PWM compensating circuit 340 may change a state of a first element during a time in which the terminal voltage Vt[k] reaches the comparison voltage Vcp, and may compensate for the PWM signal depending on a time during which a state of a second element is changed to correspond to that of the first element. In detail, the PWM compensating circuit 340 may reset the first element and the second element to the same state before the scan time for the LED. In this case, the first element and the second element may have substantially the same impedance. The PWM compensating circuit 340 may change the state of the first element, which is reset to the same state as the second element, during the time in which the terminal voltage Vt[k] reaches the comparison voltage Vcp. The PWM compensating circuit 340 may change the second element to be in the same state as a changed state of the first element, and may extend the PWM signal by a time during which the second element is changed.

The first element and the second element may be capacitors which have the same capacity. During the scan time for the LED, the PWM compensating circuit 340 may change a voltage of the first capacitor by charging or discharging the first capacitor by one current source during the time in which the terminal voltage Vt[k] reaches the comparison voltage Vcp. The PWM compensating circuit 340 may extend the ON period of the PWM signal by the time during which a voltage of the second capacitor is changed to correspond to a changed voltage of the first capacitor. In this case, the first capacitor and the second capacitor may be reset to the same state before the scan time for the LED, and may be charged or discharged through the same current source.

An example of the PWM compensating circuit 340 having such a simple circuit configuration will be described below with reference to FIGS. 9 to 11.

Figure 9:
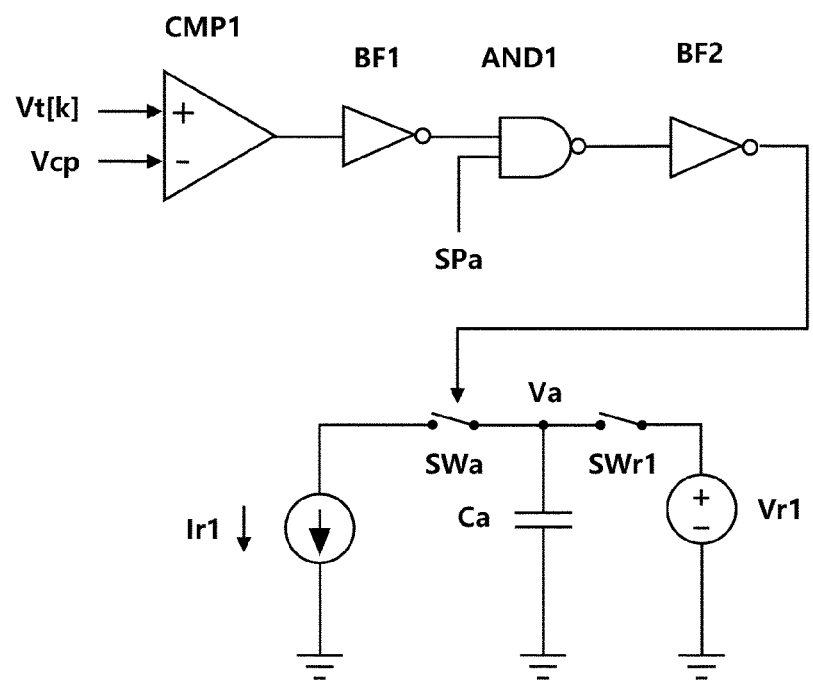
FIG. 9 is a configuration diagram of a reaching time measurement circuit in accordance with an embodiment.

FIG. 9 is a configuration diagram of a reaching time measurement circuit in accordance with an embodiment.

Referring to FIG. 9, the reaching time measurement circuit 810 may receive the terminal voltage Vt[k] being sensed during the K-th scan time (a current scan time) and the comparison voltage Vcp, and may input the two voltages to a first comparator CMP1. The reaching time measurement circuit 810 may input an output of the first comparator CMP1 to a first buffer BF1, and may input an inverted output of the first buffer BF1 to one terminal of a first AND circuit AND1. The reaching time measurement circuit 810 may input the primary PWM signal SPa to the other terminal of the first AND circuit AND1, may input an inverted output of the first AND circuit AND1 to a second buffer BF2, and may control the opening of a first charge/discharge switch SWa by using an inverted output of the second buffer BF2.

When the first charge/discharge switch SWa is closed, the charge charged in a first capacitor Ca is discharged at a constant rate by a first discharge current source Ir1, and when the first charge/discharge switch SWa is opened, the discharge of the first capacitor Ca is stopped. The first charge/discharge switch SWa may be closed from a rising edge of the primary PWM signal SPa to a time point when the terminal voltage Vt[k] becomes the same as the comparison voltage Vcp through the first comparator CMP1. A voltage Va of the first capacitor Ca after the first charge/discharge switch SWa is opened may be the voltage value Va corresponding to the forward voltage reaching time.

An initial charge voltage of the first capacitor Ca may be determined by a first reference voltage Vr1, and the voltage of the first capacitor Ca may be reset to the first reference voltage Vr1 by a first reset switch SWr1.

Figure 10A:
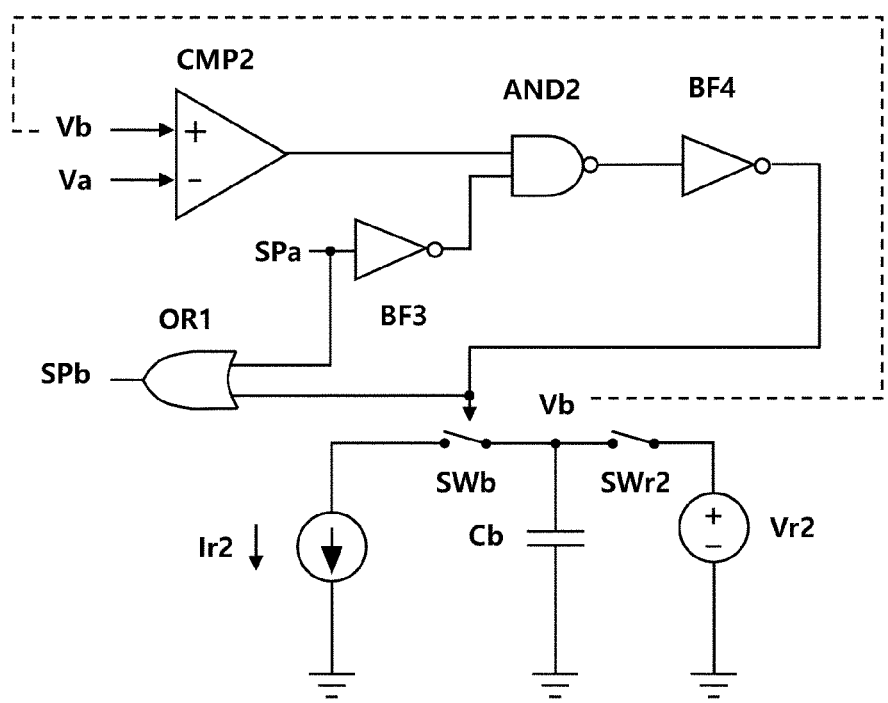
FIG. 10A is a configuration diagram of a first example of a time extension circuit in accordance with an embodiment.
Figure 10B:
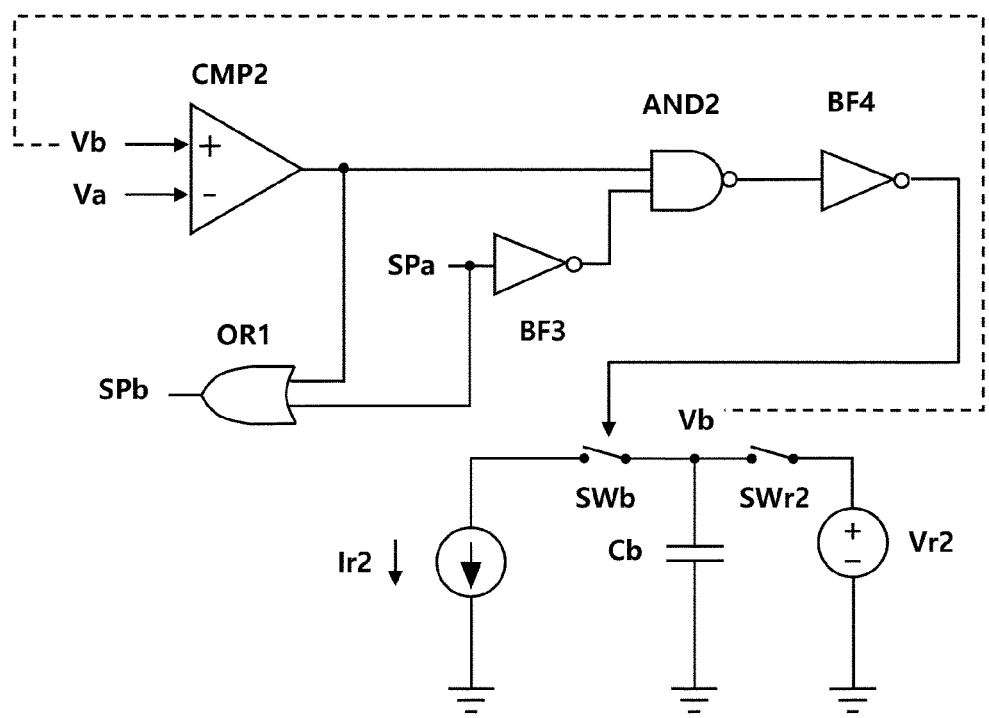
FIG. 10B is a configuration diagram of a second example of a time extension circuit in accordance with an embodiment.

FIG. 10A is a configuration diagram of a first example of a time extension circuit in accordance with an embodiment, and FIG. 10B is a configuration diagram of a second example of a time extension circuit in accordance with an embodiment.

Referring to FIGS. 10A and 10B, time extension circuits 820a and 820b may reset a second capacitor Cb to a second reference voltage Vr2, and may compensate for the PWM signal by a time during which a voltage Vb of the second capacitor Cb becomes the same as the voltage Va of the first capacitor Ca while discharging the second capacitor Cb according to a second discharge current source Ir2.

In detail, the time extension circuits 820a and 820b may input the voltage Vb of the second capacitor Cb reset to the second reference voltage Vr2 and the voltage Va of the first capacitor Ca to a second comparator CMP2, and may input an output of the second comparator CMP2 to one terminal of a second AND circuit AND2. The time extension circuits 820a and 820b may invert the primary PWM signal SPa through a third buffer BF3, and may input an inverted signal of the third buffer BF3 to the other terminal of the second AND circuit AND2.

The time extension circuits 820a and 820b may input an inverted output of the second AND circuit AND2 to a fourth buffer BF4, and may control a second charge/discharge switch SWb depending on an inverted output of the fourth buffer BF4.

When the second charge/discharge switch SWb is closed, the charge charged in the second capacitor Cb is discharged at a constant rate by the second discharge current source Ir2, and when the second charge/discharge switch SWb is opened, the discharge of the second capacitor Cb is stopped. The second charge/discharge switch SWb may be closed from a falling edge of the primary PWM signal SPa to a time point when the second capacitor voltage Vb becomes the same as the first capacitor voltage Va through the second comparator CMP2.

An initial charge voltage of the second capacitor Cb may be determined by the second reference voltage Vr2, and the voltage of the second capacitor Cb may be reset to the second reference voltage Vr2 by a second reset switch SWr2.

Referring to FIGS. 9 and 10 together, the capacity of the first capacitor Ca and the capacity of the second capacitor Cb may be the same, and the magnitudes of the current discharged by the first discharge current source Ir1 and the current discharged by the second discharge current source Ir2 may be the same, and the voltage of the first reference voltage Vr1 and the voltage of the second reference voltage Vr2 may be the same. According to such setting, the forward voltage reaching time may be the same as the closing time of the second charge/discharge switch SWb.

The time extension circuit 820a according to the first example may generate the secondary PWM signal SPb by ORing the primary PWM signal SPa and the control signal for the second charge/discharge switch SWb by an OR circuit OR1.

The time extension circuit 820b according to the second example may generate the secondary PWM signal SPb by ORing the primary PWM signal SPa and the output of the second comparator CMP2 by an OR circuit OR1.

The first comparator CMP1 and the second comparator CMP2 illustrated in FIGS. 9, 10A and 10B may be combined and thereby configure one comparator. The one comparator may have four input terminals and one output terminal. The terminal voltage Vt[k], the comparison voltage Vcp, the voltage Va of the first capacitor Ca and the voltage Vb of the second capacitor Cb may be inputted to the four input terminals. The one comparator may output, through the output terminal, a comparison value of the terminal voltage Vt[k] and the comparison voltage Vcp or a comparison value of the voltage Va of the first capacitor Ca and the voltage Vb of the second capacitor Cb. The one comparator may time-divisionally output the comparison values. For example, the one comparator may output the comparison value of the terminal voltage Vt[k] and the comparison voltage Vcp during a period in which the voltage Va of the first capacitor Ca is changed (a period in which the forward voltage reaching time is measured), and may output the comparison value of the voltage Va of the first capacitor Ca and the voltage Vb of the second capacitor Cb during a period in which the voltage Vb of the second capacitor Cb is changed (a period in which the ON period of the PWM signal is extended).

Figure 11:
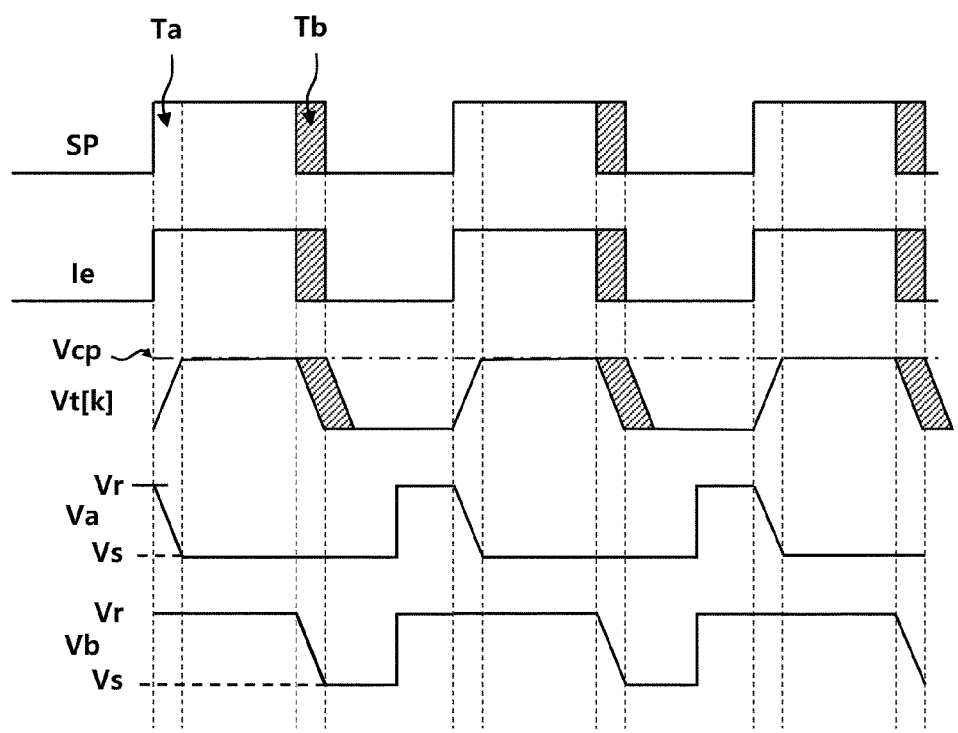
FIG. 11 is a diagram showing main waveforms of the circuits illustrated in FIGS. 9, 10A and 10B.

FIG. 11 is a diagram showing main waveforms of the circuits illustrated in FIGS. 9, 10A and 10B.

Referring to FIG. 11, the comparison voltage Vcp maintains a constant level. Although the comparison voltage Vcp is updated during each scan time, the value of the comparison voltage Vcp may be maintained at the constant level when LEDs are placed under similar conditions. The comparison voltage Vcp may change with a certain tendency with the lapse of time.

During a time in which an LED is driven, the terminal voltage Vt[k] may rise from a rising edge of the PWM signal SP and may maintain a constant level after reaching the forward voltage. The terminal voltage Vt[k] may fall from a falling edge of the PWM signal SP.

The first capacitor voltage Va may be reset to a reference voltage Vr, and may start to fall from the rising edge of the PWM signal SP. The first capacitor voltage Va may stop falling at a time point when the terminal voltage Vt[k] becomes the same as the comparison voltage Vcp. A time from the rising edge of the PWM signal SP to the time point when the terminal voltage Vt[k] becomes the same as the comparison voltage Vcp may be a forward voltage reaching time Ta.

The second capacitor voltage Vb may be reset to the reference voltage Vr, and may start to fall from a falling edge of a primary PWM signal. The second capacitor voltage Vb may stop falling at a time point when the second capacitor voltage Vb becomes the same as the first capacitor voltage Va. A time from the falling edge of the primary PWM signal to the time point when the second capacitor voltage Vb becomes the same as the first capacitor voltage Va may be a compensation time Tb.

The PWM signal SP may be compensated into a state in which the ON period thereof is increased by the compensation time Tb.

As is apparent from the above description, according to the embodiments, it is possible to more accurately control a turn-on time of a PWM signal so that the brightness of an LED can match a gray scale value. Also, according to the embodiments, it is possible to compensate for a PWM signal for a forward voltage reaching time of an LED so that no loss in a gray scale value is caused. Further, according to the embodiments, it is possible to simply measure a forward voltage reaching time of an LED without using a separate sequence. Moreover, according to the embodiments, it is possible to accurately measure a forward voltage reaching time of an LED, regardless of a change in characteristics of a panel, by continuously updating a forward voltage of the LED. In addition, according to the embodiments, it is possible to compensate for a PWM signal using a simple circuit.

What is claimed is:

1. An LED driving device comprising:
   a driving current source configured to supply a driving current to a driving line to which a plurality of LEDs are connected;
   a driving control circuit configured to control a supply time of the driving current to the driving line according to a pulse width modulation (PWM) signal;
   a measurement circuit configured to sense a voltage of one side of the LED and to output a comparison voltage corresponding to a forward voltage of the LED and the voltage of the one side; and
   a PWM compensating circuit configured to, during a scan time for the LED, change a voltage of a first capacitive element during a time in which the voltage of the one side reaches the comparison voltage and to compensate for the PWM signal depending on a time during which a voltage of a second capacitive element is changed to correspond to that of the first capacitive element.

2. The LED driving device of claim 1, wherein the PWM compensating circuit resets the first capacitive element and the second capacitive element to be in an identical state before the scan time for the LED.

3. The LED driving device of claim 2, wherein the first capacitive element and the second capacitive element have substantially a same impedance.

4. The LED driving device of claim 1, wherein
   the driving control circuit controls the driving current to be supplied to the driving line during an ON period of the PWM signal, and
   the PWM compensating circuit changes the voltage of the second capacitive element from an ending time point of the ON period of the PWM signal before compensation.

5. The LED driving device of claim 1, wherein the comparison voltage is a forward voltage of another LED which is driven during a previous scan time.

6. The LED driving device of claim 1, wherein the measurement circuit measures and stores a forward voltage of each LED and generates the comparison voltage according to a stored value of the forward voltage.

7. The LED driving device of claim 6, wherein the measurement circuit measures a forward voltage of each LED using a counter and stores a value outputted from the counter in a memory.

8. An LED driving device comprising:
   a driving current source configured to supply a driving current to a driving line to which a plurality of LEDs are connected;
   a driving control circuit configured to control a supply time of the driving current to the driving line according to a pulse width modulation (PWM) signal;
   a measurement circuit configured to sense a voltage of one side of the LED and to output a comparison voltage, corresponding to a forward voltage of the LED, and the voltage of the one side of the LED; and
   a PWM compensating circuit configured to, during a scan time for the LED, change a voltage of a first capacitor during a time in which the voltage of the one side reaches the comparison voltage and to extend an ON period of the PWM signal during a time in which a voltage of a second capacitor is changed to correspond to a changed voltage of the first capacitor.

9. The LED driving device of claim 8, wherein the PWM compensating circuit resets the first capacitor and the second capacitor to be in an identical state before the scan time for the LED.

10. The LED driving device of claim 9, wherein the PWM compensating circuit changes voltages by charging or discharging the first capacitor and the second capacitor using a constant current.

11. The LED driving device of claim 10, wherein
   capacitance of the first capacitor and the second capacitor are substantially the same and a magnitude of current, with which the first capacitor is charged or discharged, is substantially the same as a magnitude of current with which the second capacitor is charged or discharged.

12. The LED driving device of claim 8, wherein the PWM compensating circuit comprises a comparator configured to output a comparison value between the voltage of the one side and the comparison voltage during a period in which a voltage of the first capacitor is changed and to output a comparison value between a voltage of the first capacitor and a voltage of the second capacitor during a period in which a voltage of the second capacitor is changed.

13. The LED driving device of claim 12, wherein the comparator receives, as inputs, the voltage of the one side, the comparison voltage, a voltage of the first capacitor, and a voltage of the second capacitor and outputs a comparison value between the voltage of the one side and the comparison voltage or a comparison value between a voltage of the first capacitor and a voltage of the second capacitor.

14. The LED driving device of claim 8, wherein the measurement circuit holds the voltage of the one side measured at a time point when an ON period of the PWM signal ends during a K (K is a natural number)-th scan time and outputs the held voltage as the comparison voltage during a (K+1)-th scan time.

15. The LED driving device of claim 8, wherein the measurement circuit measures and stores a forward voltage of each LED and generates the comparison voltage according to a stored value of the forward voltage.

\* \* \* \* \*